(12) United States Patent
Guez et al.

(10) Patent No.: US 12,470,596 B2
(45) Date of Patent: Nov. 11, 2025

(54) MODEL FOR DETECTING PHISHING URLS

(71) Applicant: PALO ALTO NETWORKS (ISRAEL ANALYTICS) LTD., Tel Aviv (IL)

(72) Inventors: Yohan Guez, Tel Aviv (IL); Erez Harush, Tel Aviv (IL)

(73) Assignee: Palo Alto Networks, Inc., Santa Clara, CA (US)

(\*) Notice: Subject to any disclaimer, the term of this patent is extended or adjusted under 35 U.S.C. 154(b) by 204 days.

(21) Appl. No.: 18/295,857

(22) Filed: Apr. 5, 2023

(65) Prior Publication Data

US 2024/0340313 A1    Oct. 10, 2024

(51) Int. Cl.
*H04L 9/40* (2022.01)
*G06V 30/18* (2022.01)

(52) U.S. Cl.
CPC .... *H04L 63/1483* (2013.01); *G06V 30/18143* (2022.01); *G06V 2201/09* (2022.01)

(58) Field of Classification Search
CPC ................ H04L 63/1483; G06V 30/18143
USPC ............................................................ 726/22
See application file for complete search history.

(56) References Cited

U.S. PATENT DOCUMENTS

| | | |
|---|---|---|
| 8,146,146 B1 | 3/2012 | Coviello et al. |
| 8,245,304 B1 | 8/2012 | Chen et al. |
| 8,285,830 B1 | 10/2012 | Stout et al. |
| 8,316,440 B1 | 11/2012 | Hsieh et al. |
| 8,555,388 B1 | 10/2013 | Wang et al. |
| 8,561,188 B1 | 10/2013 | Wang et al. |
| 8,677,487 B2 | 3/2014 | Balupari et al. |
| 8,713,674 B1 | 4/2014 | Geide |
| 8,826,434 B2 * | 9/2014 | Merza ................ H04L 63/1416 726/23 |
| 8,893,286 B1 * | 11/2014 | Oliver ..................... G06F 21/57 726/22 |

(Continued)

FOREIGN PATENT DOCUMENTS

| | | |
|---|---|---|
| CN | 114077741 A | 2/2022 |
| JP | 2008243034 A | 10/2008 |

(Continued)

OTHER PUBLICATIONS

Yazan Ahmad Alsariera; AI Meta-Learners and Extra-Trees Algorithm for the Detection of Phishing Websites; IEEE:2020; pp. 142532-142542.*

(Continued)

*Primary Examiner* — Monjur Rahim
(74) *Attorney, Agent, or Firm* — Meitar Patents Ltd.; Daniel Kligler

(57) ABSTRACT

Methods, storage systems and computer program products implement embodiments of the present invention for protecting a computing device. These embodiments include detecting that an email is received by the computing device, the email including a Uniform Resource Locator (URL) for a web page in a first domain. The web page is retrieved from the domain, and a set of keywords are extracted from the retrieved web page. A query included the set of keywords is submitted to a search engine, and a response to the query is received from the search engine, the response indicating a set of second domain. Finally, in response to detecting that the first domain does not match any of the second domains, an alert for a phishing attack is generated.

23 Claims, 6 Drawing Sheets

(56) References Cited

U.S. PATENT DOCUMENTS

| | | | |
|---|---|---|---|
| 8,955,114 B2 | 2/2015 | Dolan-Gavitt et al. | |
| 8,966,625 B1 | 2/2015 | Zuk et al. | |
| 9,038,178 B1 | 5/2015 | Lin et al. | |
| 9,130,982 B2 | 9/2015 | Gottlieb et al. | |
| 9,147,071 B2 | 9/2015 | Sallam | |
| 9,154,516 B1 | 10/2015 | Vaystikh et al. | |
| 9,215,239 B1 | 12/2015 | Wang et al. | |
| 9,342,691 B2 | 5/2016 | Maestas | |
| 9,378,361 B1 | 6/2016 | Yen et al. | |
| 9,386,028 B2 | 7/2016 | Altman | |
| 9,462,008 B2 | 10/2016 | Bartos et al. | |
| 9,998,484 B1 | 6/2018 | Buyukkayhan et al. | |
| 10,148,690 B2 | 12/2018 | Shen et al. | |
| 10,257,295 B1 | 4/2019 | Alpert et al. | |
| 10,425,436 B2* | 9/2019 | Firstenberg | H04L 43/16 |
| 10,574,681 B2 | 2/2020 | Meshi et al. | |
| 10,587,647 B1 | 3/2020 | Khalid et al. | |
| 10,601,866 B2* | 3/2020 | Bartik | H04L 67/02 |
| 10,623,446 B1 | 4/2020 | Stoler | |
| 11,457,040 B1 | 9/2022 | Sole et al. | |
| 11,516,232 B1 | 11/2022 | Sumpter et al. | |
| 2003/0105980 A1 | 6/2003 | Challener et al. | |
| 2003/0110379 A1 | 6/2003 | Ylonen et al. | |
| 2006/0200487 A1 | 9/2006 | Adelman et al. | |
| 2007/0064617 A1 | 3/2007 | Reves | |
| 2007/0143852 A1 | 6/2007 | Keanini et al. | |
| 2008/0034425 A1 | 2/2008 | Overcash et al. | |
| 2008/0060054 A1 | 3/2008 | Srivastava | |
| 2008/0082662 A1 | 4/2008 | Dandliker et al. | |
| 2008/0256622 A1 | 10/2008 | Neystadt et al. | |
| 2009/0119397 A1 | 5/2009 | Neerdaels | |
| 2010/0042622 A1 | 2/2010 | Matkowsky | |
| 2010/0235915 A1 | 9/2010 | Memon et al. | |
| 2011/0016525 A1 | 1/2011 | Jeong et al. | |
| 2011/0066624 A1* | 3/2011 | Turakhia | G06F 16/951 707/748 |
| 2011/0185429 A1 | 7/2011 | Sallam | |
| 2011/0239300 A1 | 9/2011 | Klein et al. | |
| 2011/0283357 A1 | 11/2011 | Pandrangi et al. | |
| 2011/0302656 A1 | 12/2011 | El-Moussa | |
| 2012/0158626 A1* | 6/2012 | Zhu | G06F 21/56 726/22 |
| 2013/0007233 A1 | 1/2013 | Lv et al. | |
| 2013/0031625 A1 | 1/2013 | Lim | |
| 2014/0007238 A1 | 1/2014 | Magee et al. | |
| 2014/0165207 A1 | 6/2014 | Engel et al. | |
| 2014/0181973 A1 | 6/2014 | Lee et al. | |
| 2015/0128263 A1 | 5/2015 | Raugas et al. | |
| 2015/0149530 A1 | 5/2015 | Maret et al. | |
| 2015/0170072 A1 | 6/2015 | Grant et al. | |
| 2015/0172300 A1 | 6/2015 | Cochenour | |
| 2015/0195299 A1 | 7/2015 | Zoldi et al. | |
| 2015/0358344 A1 | 12/2015 | Mumcuoglu et al. | |
| 2015/0365437 A1 | 12/2015 | Bell, Jr. et al. | |
| 2015/0373039 A1 | 12/2015 | Wang | |
| 2015/0373043 A1 | 12/2015 | Wang et al. | |
| 2016/0042287 A1 | 2/2016 | Eldardiry et al. | |
| 2016/0057165 A1 | 2/2016 | Thakar et al. | |
| 2016/0099852 A1 | 4/2016 | Cook et al. | |
| 2016/0104203 A1 | 4/2016 | Roosenraad et al. | |
| 2016/0134651 A1 | 5/2016 | Hu et al. | |
| 2016/0150004 A1 | 5/2016 | Hentunen | |
| 2016/0156655 A1 | 6/2016 | Lotem et al. | |
| 2016/0234167 A1 | 8/2016 | Engel et al. | |
| 2016/0294773 A1 | 10/2016 | Yu et al. | |
| 2016/0352772 A1* | 12/2016 | O'Connor | H04L 63/1483 |
| 2016/0366159 A1 | 12/2016 | Chiba et al. | |
| 2017/0026398 A1 | 1/2017 | Mumcuoglu et al. | |
| 2017/0041333 A1* | 2/2017 | Mahjoub | H04L 43/0876 |
| 2017/0098086 A1 | 4/2017 | Hoernecke et al. | |
| 2017/0123875 A1 | 5/2017 | Craik et al. | |
| 2017/0126718 A1* | 5/2017 | Baradaran | H04L 63/0281 |
| 2017/0149807 A1 | 5/2017 | Schilling et al. | |
| 2017/0244745 A1 | 8/2017 | Key et al. | |
| 2017/0323548 A1 | 11/2017 | Glatfelter et al. | |
| 2018/0013778 A1 | 1/2018 | Lim et al. | |
| 2018/0054449 A1 | 2/2018 | Nandha et al. | |
| 2018/0063174 A1 | 3/2018 | Grill et al. | |
| 2018/0069884 A1* | 3/2018 | Firstenberg | H04L 43/12 |
| 2018/0139224 A1 | 5/2018 | Amell et al. | |
| 2018/0285567 A1 | 10/2018 | Raman | |
| 2018/0288073 A1 | 10/2018 | Hopper | |
| 2018/0351930 A1 | 12/2018 | Kim et al. | |
| 2019/0007440 A1 | 1/2019 | Lavi et al. | |
| 2019/0058724 A1 | 2/2019 | Kraning et al. | |
| 2019/0068575 A1 | 2/2019 | Vongsouvanh et al. | |
| 2019/0068624 A1 | 2/2019 | Compton | |
| 2019/0068638 A1* | 2/2019 | Bartik | H04L 63/1483 |
| 2019/0081952 A1 | 3/2019 | Wood | |
| 2019/0190931 A1 | 6/2019 | Levin et al. | |
| 2019/0250911 A1 | 8/2019 | Lospinuso et al. | |
| 2019/0297097 A1 | 9/2019 | Gong et al. | |
| 2019/0319977 A1 | 10/2019 | Gottschlich et al. | |
| 2019/0319981 A1 | 10/2019 | Meshi et al. | |
| 2019/0372934 A1 | 12/2019 | Yehudai et al. | |
| 2019/0387005 A1 | 12/2019 | Zawoad et al. | |
| 2020/0007548 A1 | 1/2020 | Sanghavi et al. | |
| 2020/0014714 A1 | 1/2020 | Mortensen et al. | |
| 2020/0067913 A1 | 2/2020 | Kapoor et al. | |
| 2020/0177625 A1 | 6/2020 | Rouvinen | |
| 2020/0213333 A1 | 7/2020 | Deutschmann et al. | |
| 2020/0233791 A1 | 7/2020 | Manzano et al. | |
| 2020/0244658 A1 | 7/2020 | Meshi et al. | |
| 2020/0364354 A1 | 11/2020 | Schwartz et al. | |
| 2020/0412717 A1 | 12/2020 | Puertas Calvo et al. | |
| 2021/0014198 A1 | 1/2021 | Amoudi et al. | |
| 2021/0136037 A1 | 5/2021 | Balasubramaniam | |
| 2021/0258325 A1 | 8/2021 | Meyer et al. | |
| 2021/0266331 A1 | 8/2021 | Meshi et al. | |
| 2021/0289371 A1 | 9/2021 | Bagwell | |
| 2022/0006819 A1 | 1/2022 | Allon et al. | |
| 2022/0070216 A1* | 3/2022 | Kohavi | H04L 63/1416 |
| 2022/0342976 A1 | 10/2022 | Stoyanov et al. | |
| 2022/0353284 A1* | 11/2022 | Vörös | H04L 63/1441 |
| 2022/0385694 A1* | 12/2022 | Zverkov | G06V 10/751 |
| 2023/0086281 A1 | 3/2023 | Kaidi | |
| 2023/0118679 A1* | 4/2023 | Mayer | H04L 63/1433 707/706 |
| 2023/0403265 A1 | 12/2023 | Gaffney et al. | |
| 2024/0015176 A1* | 1/2024 | Egbert | H04L 63/1416 |

FOREIGN PATENT DOCUMENTS

| | | |
|---|---|---|
| WO | 2012167056 A2 | 12/2012 |
| WO | 2020148934 A1 | 7/2020 |

OTHER PUBLICATIONS

U.S. Appl. No. 18/353,115 Office Action dated May 1, 2024.
International Applicaton PCT/IB2023/056071 Search Report dated Sep. 22, 2023.
Alon, "Compromised Cloud Compute Credentials: Case Studies from the Wild," Unit 42, Palo Alto Networks, Inc., pp. 1-14, Dec. 8, 2022, as downloaded from as downloaded from https://unit42.paloaltonetworks.com/compromised-cloud-compute-credentials/.
JP Application # 2024504256 Office Action dated Oct. 8, 2024.
U.S. Appl. No. 17/844,097 Office Action dated Nov. 19, 2024.
U.S. Appl. No. 18/591,004 Office Action dated Dec. 3, 2024.
Wei et al., "Identifying New Spam Domains by Hosting IPS: Improving Domain Blacklisting", Dept. of Computer and Information Sciences, University of Alabama at Birmingham, pp. 1-8, Jan. 2010.
Iana., "Autonomous System (AS) Numbers", 1 page, Jul. 29, 2016.
Gross et al., "FIRE: Finding Rogue nEtworks", Annual Conference on Computer Security Applications, pp. 1-10, Dec. 7-11, 2009.
Frosch., "Mining DNS-related Data for Suspicious Features", Ruhr Universitat Bochum, Master's Thesis, pp. 1-88, Dec. 23, 2011.
Bilge et at., "Disclosure: Detecting Botnet Command and Control Servers Through Large-Scale NetFlow Analysis", Annual Conference on Computer Security Applications, pp. 1-10, Dec. 3-7, 2012.
Blum., "Combining Labeled and Unlabeled Data with Co-

(56) References Cited

OTHER PUBLICATIONS

Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.

Konte et al., "ASwatch: An AS Reputation System to Expose Bulletproof Hosting ASes", SIGCOMM, pp. 625-638, Aug. 17-21, 2015.

Markowitz, N., "Bullet Proof Hosting: A Theoretical Model", Security Week, pp. 1-5, Jun. 29, 2010, downloaded from http://www.infosecisland.com/blogview/4487-Bullet-Proof-Hosting-A-Theoretical-Model.html.

Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.

Goncharov, M., "Criminal Hideouts for Lease: Bulletproof Hosting Services", Forward-Looking Threat Research (FTR) Team, A TrendLabsSM Research Paper, pp. 1-28, Jul. 3, 2015.

Bilge at al., "Exposure: Finding Malicious Domains Using Passive DNS Analysis", NDSS Symposium, pp. 1-17 Feb. 6-9, 2011.

Xu et al., "We know it before you do: Predicting Malicious Domains", Virus Bulletin Conference, pp. 73-33, Sep. 2014.

Palo Alto Networks, "Cortex XDR", p. 1-7, year 2020.

"GeoIP Databases & Services: Industry Leading IP Intelligence," MaxMind, Inc., pp. 1-3, updated Jan. 14, 2022, as downloaded from https://www.maxmind.com/en/geoip2-services-and-databases.

Alon et al., U.S. Appl. No. 17/844,097, filed Jun. 20, 2022.

Mandiant, "Highly Evasive Attacker Leverages SolarWinds Supply Chain to Compromise Multiple Global Victims with SUNBURST Backdoor", pp. 1-16, Dec. 13, 2020 downloaded from https://www.mandiant.com/resources/blog/evasive-attacker-leverages-solarwinds-supply-chain-compromises-with-sunburst-backdoor.

Zan et al., U.S. Appl. No. 17/857,196, filed Jul. 5, 2022.

U.S. Appl. No. 17/857,196 Office Action dated Dec. 7, 2023.

Palo Alto Networks, "Cortex Xsoar—Phishing Investigation—Generic v2," pp. 1-6, year 2020, as downloaded from https://web.archive.org/web/20200927223050/https://xsoar.pan.dev/docs/reference/playbooks/phishing-investigation-generic-v2.

GitHub, cburgmer/rasterizeHTML.js, pp. 1-2, Jan. 19, 2020, as downloaded from https://web.archive.org/web/20200219074432/https://github.com/cburgmer/rasterizeHTML.js.

Refsnes Data, "W3Schools,—HTML <form> Tag," pp. 1-10, years 1999-2023, as downloaded from https://www.w3schools.com/tags/tag_form.asp.

Refsnes Data, "W3Schools,—HTML <input> Tag," pp. 1-11, years 1999-2023, as downloaded from https://www.w3schools.com/tags/tag_input.asp.

Microsoft 365, "Exchange—Work Smarter with Business-Class Email and Calendaring," pp. 1-4, Aug. 15, 2020, as downloaded from https://web.archive.org/web/20200815211502/https://www.microsoft.com/en-ww/microsoft-365/exchange/email.

Wikipedia, "Selenium (Software)," pp. 1-5, last edited Dec. 3, 2019, as downloaded from https://web.archive.org/web/20191218132058/https://en.wikipedia.org/wiki/Selenium_(software).

Wikipedia, "WHOIS," pp. 1-16, last edited Dec. 23, 2019, as downloaded from https://web.archive.org/web/20200112181104/https://en.wikipedia.org/wiki/WHOIS.

"British National Corpus," Oxford Text Archive, IT Services, University of Oxford, p. 1-1, year 2015, as downloaded from https://web.archive.org/web/20200128044646/http://www.natcorp.ox.ac.uk/.

JP Application # 2024504256 Office Action dated Jul. 2, 2024.

JP Application # 2024504256 Office Action dated Jan. 28, 2025.

U.S. Appl. No. 18/591,004 Office Action dated Apr. 7, 2025.

Final US Office Action # 18475266, dated Aug. 15, 2025.

* cited by examiner

MODEL FOR DETECTING PHISHING URLS

FIELD OF THE INVENTION

The present invention relates generally to computer security and networks, and particularly detecting phishing uniform resource locators (URLs) in communications such as emails and short message service (SMS) text messages.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computing device, including detecting an email received by the computing device and including a Uniform Resource Locator (URL) for a web page in a first domain, retrieving the web page from the domain, extracting a set of keywords from the retrieved web page, submitting, to a search engine, a query including the set of keywords, receiving, from the search engine, a response to the query, the response indicating a set of second domains, and generating an alert for a phishing attack responsively to detecting that the first domain does not match any of the second domains.

In one embodiment, the method further includes rendering the retrieved web page into Hypertext Markup Language (HTML) code, and wherein extracting the set of keywords includes extracting the set of keywords from the HTML code.

In another embodiment, extracting the set of keywords includes extracting a set of words from the retrieved web page, and applying a statistical model so as to rank the words in order of importance, wherein the set of keywords includes a specific number of the highest ranked words.

In an additional embodiment, the response also includes respective rankings for the second domains, and the method further includes generating the alert upon detecting a match between the first domain and a given second domain and detecting that the ranking for the given second domain exceeds a specified threshold.

In a further embodiment, the web page includes a first web page, wherein the first web page includes a redirection to a second web page, and wherein extracting the set of keywords includes extracting the set of keywords from the second web page.

In a redirection embodiment, the redirection includes the first web page redirecting to the second web page withing a specified amount of time.

In a supplemental embodiment, the method further includes identifying a first owner of the first domain, and identifying respective second owners for the second domains, and wherein detecting that the first domain does not match any of the second domains includes detecting that the first owner does not match any of the second owners.

In one embodiment, the domain includes a first domain, and the method further includes generating a screenshot of the retrieved web page, comparing the generated screenshot to a set of logo images having respective third domains, and generating the alert upon detecting a match between the screenshot and a given logo image, detecting that none of the third domains for the given logo image does not match the first domain.

In a first screenshot embodiment, comparing the generating screenshot to the logo images includes generating a first set of first keypoints for the retrieved web page, generating respective second sets of second keypoints for the logo images, and comparing the first set to the second sets.

In a second screenshot embodiment, detecting the match between the generated screenshot and the given logo image includes detecting at least a specified number of matches between the first set of first keypoints and the second set of second keypoints for the given logo image.

In a third screenshot embodiment, comparing the first set to the second set includes measuring respective scale-invariant feature transform (SIFT) distances between the first and the second sets.

In another embodiment, the method further includes generating the alert upon detecting a login form in the retrieved web page.

In a first login form embodiment, detecting the login form includes rendering HTML code for the retrieved web page, extracting a set of words from the HTML code, comparing the extracted words to a set of login keywords, and detecting a match between a given extracted word and a given login keyword.

In a second login form embodiment, detecting the login form includes rendering HTML code for the retrieved web page, extracting a set of HTML tags from the HTML code, comparing the extracted words to a set of login tags, and detecting a match between a given extracted word and a given login tag.

In an additional embodiment, the method further includes ascertaining an age of the first domain, and generating the alert upon detecting that the age exceeds a specified threshold.

In a further embodiment, the method also includes extracting a set of features from the URL, modeling the extracted features so as to classify the URL as either suspicious or unknown, and generating the alert upon classifying the URL as suspicious.

In a first feature embodiment, a given feature includes a number of times any of one or more specified characters are in the URL.

In a second feature embodiment, a given feature includes a number of times any of one or more specified words are in the URL.

In a third feature embodiment, a given feature includes whether or not the web page is hosted by a free hosting service.

In a fourth feature embodiment, a given feature includes whether or not the URL includes an Internet Protocol (IP) address.

In a fifth feature embodiment, a given feature includes a number of subdomains in the URL.

In a sixth feature embodiment, a given feature is selected from a group including a length of a path in the URL, a length of the URL and a length of the domain.

There is also provided, in accordance with an embodiment of the present invention, a computing device, including a memory, and a processor configured to detect an email received by the computing device and including a Uniform Resource Locator (URL) for a web page in a first domain, to retrieve the web page from the domain, to extract a set of keywords from the retrieved web page, to submit, to a search engine, a query including the set of keywords, to receive, from the search engine, a response to the query, the response indicating a set of second domains, and to generate an alert for a phishing attack responsively to detecting that the first domain does not match any of the second domains.

There is additionally provided, in accordance with an embodiment of the present invention a computer software product for protecting a computing device, the computer software product including a non-transitory computer-readable medium, in which program instructions are stored, which instructions, when read by a computer, cause the computer to detect an email received by the computing device and including a Uniform Resource Locator (URL) for a web page in a first domain, to retrieve the web page from the domain, to extract a set of keywords from the retrieved web page, to submit, to a search engine, a query including the set of keywords, to receive, from the search engine, a response to the query, the response indicating a set of second domains, and to generate an alert for a phishing attack responsively to detecting that the first domain does not match any of the second domains.

BRIEF DESCRIPTION OF THE DRAWINGS

The disclosure is herein described, by way of example only, with reference to the accompanying drawings, wherein.

DETAILED DESCRIPTION OF EMBODIMENTS

Phishing cyber-attacks can be used to steal user data such as login credentials and credit card numbers. To launch a phishing attack, an attacker typically masquerades as a trusted entity so as to deceive a victim into opening a digital communication (e.g., an email, an instant message, or a text message) that comprises a malicious link. When the recipient clicks on the malicious link, a cyber-attack can be initiated, which performs a malicious operation such as installing malware, freezing the system as part of a ransomware attack, or exfiltrating sensitive data.

Phishing attacks are one of the most frequent, easily executable, and harmful security attacks that organizations face today, regardless of the organization size. Managing high-volume, persistent phishing alerts can be time consuming, with incident response requiring coordination between multiple security products and communications with end users.

Embodiments of the present invention provide methods and systems for protecting computer devices by detecting, in digital communications, uniform resource locators (URLs) that are suspected phishing attacks. In one embodiment described hereinbelow, upon detecting an email received by the computing device and comprising a Uniform Resource Locator (URL) for a web page in a first domain, the web page is retrieved from the domain, and a set of keywords are extracted from the retrieved web page. A query comprising the set of keywords is submitted to a search engine, and a response to the query is received from the search engine, the response indicating a set of second domains. Finally, an alert is generated for a phishing attack responsively to detecting that the first domain does not match any of the second domains.

In another embodiment described hereinbelow, a table of logo images and corresponding domains is maintained, and a screenshot is created for the retrieved web page. In this embodiment, the screenshot is compared to the logo images in the table, and the alert is generated if a given logo image is found in the screenshot and the domain of the web page does not match any of the domains corresponding to the given logo image. In additional embodiments, suspicious URLs can be identified by analyzing the URL's syntax, establishing an age for the domain, and detecting the webpage comprises a login form.

Systems implementing embodiments of the present invention can use a combination of complementary heuristics (i.e., embodiments) so as to detect suspicious URLs, without any need for training (i.e., labeled) data. By using a feature-based approach with a rich set of resources (i.e., URL, HTML, Image, and third-party services), embodiments described herein can provide an effective defense against adversarial phishing attacks.

System Description

Figure 1:
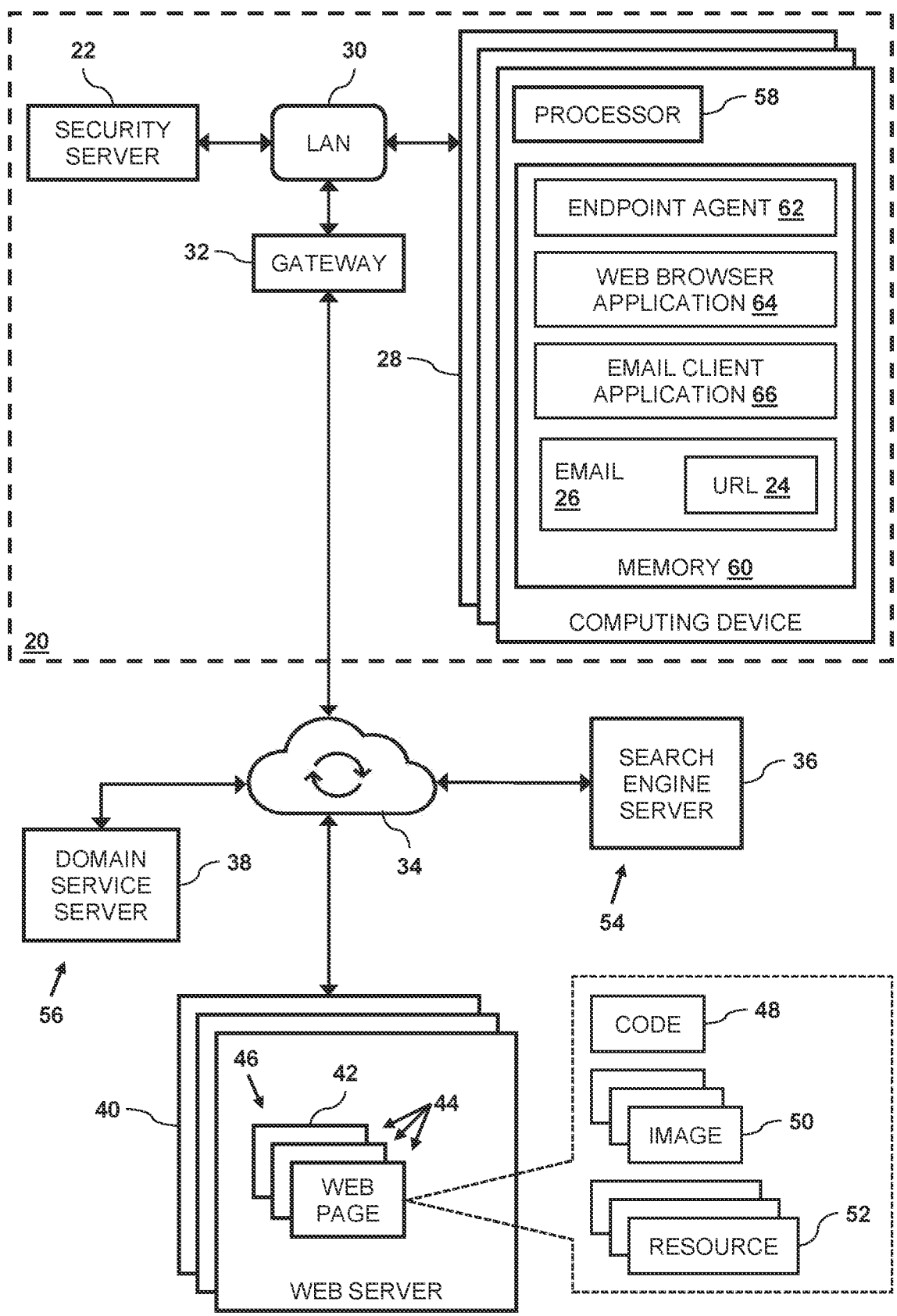
FIG. 1 is a block diagram that shows an example of a computing facility comprising a security server that can detect suspicious uniform resource locator (URL) links in digital communications received by computing devices in the facility, in accordance with an embodiment of the present invention.

FIG. 1 is a block diagram that shows an example of a computing facility 20 comprising a security server 22 that can detect suspicious uniform resource locators (URL) links 24 (also referred to herein simply as URLs 24) in digital communications 26 received by computing devices 28 in the facility, in accordance with an embodiment of the present invention. While embodiments herein describe digital communications 26 as emails (i.e., digital communications 26 may be referred to herein as emails 26) other types of digital communications 26 are considered to within the spirit and scope of the present invention. For example, the URLs may be detected in digital communications 26 such as imposter web sites, and instant messages such as short message service (SMS) text messages.

In the configuration shown in FIG. 1, security server 22 and computing devices 28 are coupled to (and communicate over) a data network such as local area network (LAN) 30. LAN 30 is also coupled to a gateway 32 that couples the LAN to a public network such as Internet 34. Gateway 32 enables computing devices 28 and security server 22 to communicate with resources coupled to Internet 34 such as a search engine server 36, a domain service server 38 and one or more web servers 40.

In some embodiments, each web server 40 hosts a set of web pages 42 having a set of respective URLs 44 in a domain 46. Each web page 42 comprises browser executable code 48 (also referred to herein simply as code 48), one or more images 50 and a set of additional resources 52 such as fonts, icons, and media files. Examples of browser executable code include HyperText Markup Language (HTML) code, JavaScript code, and Cascading Style Sheet (CSS) code.

In some embodiments, each web server 40 hosts a set of web pages 42 having a set of respective URLs 44 in a domain 46. Each web page 42 comprises browser executable code 48 (also referred to herein simply as code 48), one or more images 50 and a set of additional resources 52 such as fonts, icons, and media files. Examples of browser executable code include HyperText Markup Language (HTML) code, JavaScript code, and Cascading Style Sheet (CSS) code.

Search engine server 36 can host a search engine service 54 such as GOOGLE™ (provided by Alphabet Inc., Mountain View, CA, USA. In embodiments herein, search engine server 36 hosting search service 54 may also be referred to simply as search engine 54.

Each given computing device 28 comprises a host processor 58 and a host memory 60. Host memory 60 can store emails 26, an endpoint agent 62 such as CORTEX XSOAR™ (produced by PALO ALTO NETWORKS INC., CA, USA), a web browser application 64 such as CHROME™ (produced by Alphabet Inc.), and an email client application 66 such as OUTLOOK™ (produced by Microsoft Corporation, Redmond, WA, USA). In one embodiment, processor 58 can execute web browser 64 so as to retrieve a given email 26 from a web email provider such as GOOGLE MAIL™ (produced by Alphabet Inc.). In another embodiment, processor 58 can execute email client application 66 so as to retrieve a given email 26 from an email server such as EXCHANGE SERVER™ (produced by Microsoft Corporation).

In some embodiments, processor 58 executes endpoint agent 62 so as to monitor emails 26 (i.e., from a web email provider and/or from an email server). Upon endpoint agent 62 detecting a given email 26 comprising a given URL 24, the endpoint agent conveys the given URL to security server 22, as described in the description referencing FIG. 4 hereinbelow.

Figure 2:
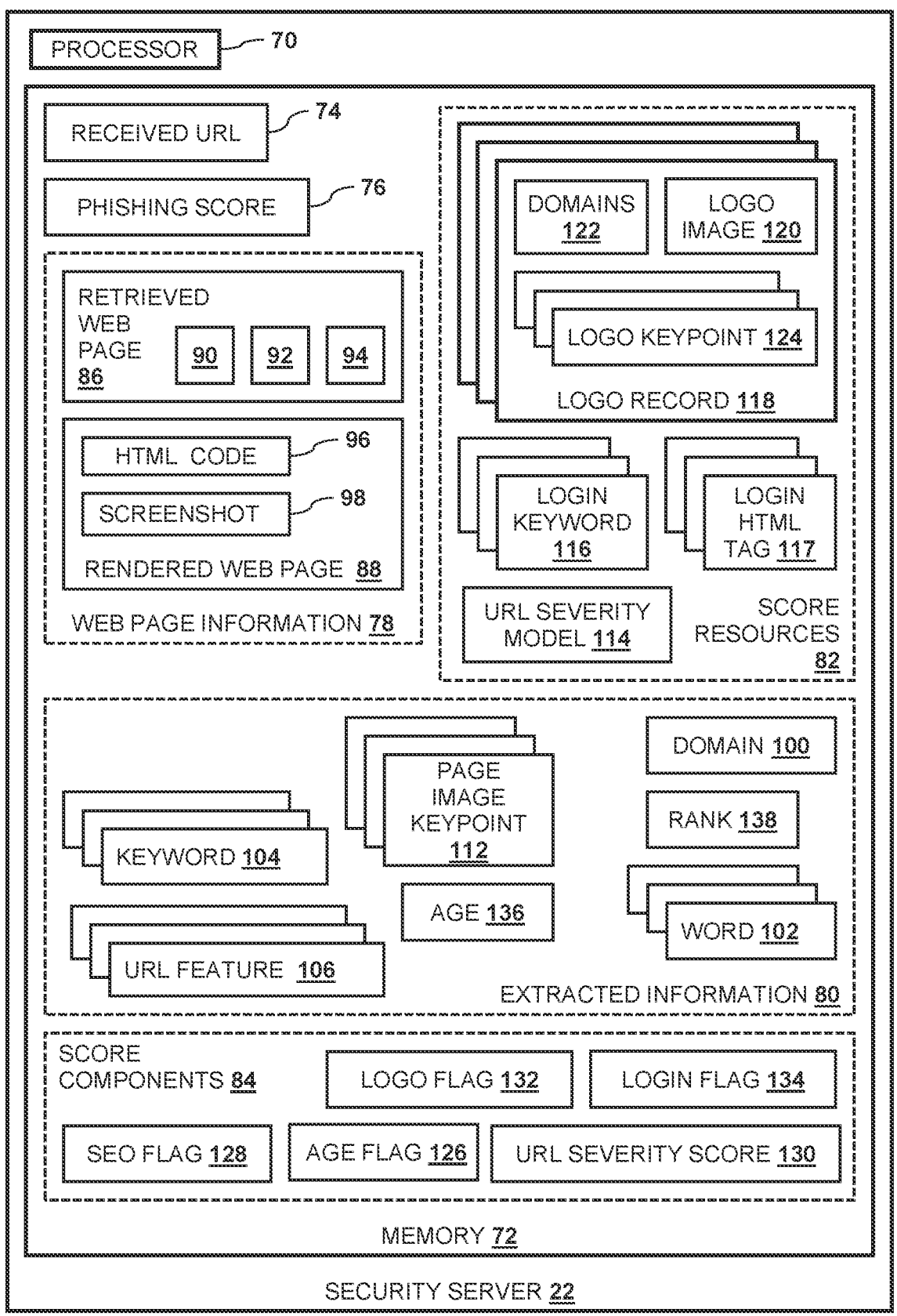
FIG. 2 is a block diagram showing an example configuration of the security server, in accordance with an embodiment of the present invention.

FIG. 2 is a block diagram showing an example of a configuration of security server 22, in accordance with an embodiment of the present invention. In the configuration shown in FIG. 2, security server 22 comprises a server processor 70 and a server memory 72 that stores a received URL 74 and a phishing score 76.

Using embodiments described herein, processor 70 receives a given URL 24 from a given endpoint agent 62, stores the given URL to received URL 74, and computes phishing score 76 that can be used to flag the received URL as either suspicious or unknown. Memory 72 also stores web page information 78, extracted information 80, score resources 82 and score components 84, which processor 70 can use to compute phishing score 76, as described hereinbelow.

Web page information 78 comprises retrieved web page 86, and rendered web page 88, and the retrieved web page comprises retrieved code 90, retrieved images 92, and retrieved resources 94. In embodiments herein, upon processor 70 storing the given URL to received URL 74, the server processor can retrieve a given web page 42 referenced by the given URL, and copy the given web page to retrieved web page 86 by copying code 48 from the given web page to code 90, copying image(s) 50 from the given web page to image(s) 92, and copying resource(s) 52 from the given web page to resource (s) 94. Upon retrieving and copying the given web page to retrieved web page 86, processor 70 can render, in memory 72, the given web page.

In some embodiments, processor 70 can use a software library such as SELENIUM™ (provided by Thoughtworks, Chicago, IL, USA) in order to render the given web page as rendered web page 88. Rendered web page 88 comprises HTML code 96 and screenshot 98. HTML code 96 comprises the HTML code in the Document Object Model (DOM) when processor 70 renders the given web page, and screenshot 98 comprises an image (e.g., a JPG image) of the rendered web page.

Extracted information 80 stores information that processor 70 extracts from rendered web page 88, and comprises a domain 100, a set of words 102, a set of keywords 104, a set of URL features 106, a domain age 136, a search engine ranking 138 and a set of page image keypoints 112 for screenshot 98. In embodiments described herein, processor 70 can populate extracted information 80 as follows:

Processor 70 can extract a domain name from the received URL, and store the extracted domain name to domain 100. The extracted domain name comprises domain 46 for the web server hosting the received URL.

Processor 70 can extract, from HTML code 96, words 102 (i.e., units of text delimited by blank spaces) that the server processor identifies when rendering retrieved web page 86. In other words, words 102 comprise text that would be visible on a display (not shown) if processor 70 renders retrieved web page 86 on the display.

In some embodiments, processor 70 can identify keywords 104 comprising a specific number (e.g., 4, 5 or 6) of the "most important" words 102. In some embodiments, processor 70 can use a statistical model such as a term frequency-inverse document frequency (TF-IDF) model in order to identify keywords 104. In some embodiments, the statistical model can rank words 102 in order of importance, and processor 70 can select the highest-ranking words 102 to be keywords 104.

For example, if the retrieved web page is for a football team, examples of keywords 102 may comprise "football", "tickets", "stadium, "team", "player" and "schedule".

Applying the statistical model can filter out "less important" (i.e., more common) words such as "color", "the", "inside", and "date".

Using embodiments described hereinbelow, processor 70 can ascertain domain age 136 for domain 100.

Processor 70 can extract URL features 106 from the received URL. Examples of features 106 include, but are not limited to:

- A number of times the character "." is in the received URL.
- A number of the character "?" in the received URL.
- Whether or not (i.e., a binary value) processor 70 detects the character "-" in the received URL.
- Whether or not processor 70 detects a URL keyword in the received URL. Examples of URL keywords include, but are not limited to "secure", "account", "webscr", "login", "signin", "banking", "confirm", "logon", "update", "wp", "index", "submit", "payment", "dropbox" and "home". Typically, the received URL is more suspicious if it includes any of these URL keywords.
- Whether or not the web page referenced by the received URL is hosted on a free web hosting platform. Processor can ascertain this by querying WHOIS™ with the received URL.
- Whether or not the URL for the retrieved web page comprises a redirected URL 44. For example, processor 70 may retrieve a first web page 42 (i.e., retrieved web page 86) corresponding to received URL 74, wherein the received URL comprises a first URL 44. Upon rendering the first web page, the first web page may comprise an automatic redirection to a second web page 42 corresponding to a second (i.e., redirected) URL 44. In some embodiments, processor 70 can "wait" a specific time period (e.g., 5, 6 or 7 seconds) to ascertain whether or not the web page corresponding to received URL redirects to a different web page 42. In some embodiments, upon detecting a redirection, processor 70 can update received URL 74 with the second (i.e., redirected) URL, and update retrieved web page with the second (i.e., redirected) web page.
- Whether or not the received URL comprises a specific company name. For example, memory 70 may comprise a list of company names, and processor 70 can see if any of the company names are found in the received URL. In some embodiments, the list may comprise popular company names used in phishing attacks.
- Whether or not the received URL comprises an Internet Protocol (IP) address.
- A length of the received URL.
- A length of domain 100 for the received URL.
- A number of non-overlapping special characters in the received URL. In some embodiments the non-special characters may comprise characters that are not numeric (i.e., between 0-9) and not alphabetical (i.e., not "a"-"z" and not "A"-"Z"). Processor 70 can compute this feature by identifying how many times a special character appears in the received URL. For example, if the received UR comprises two instances of the character "?" and a single instance of the character "*", then professor 70 can compute this feature 106 as 3.
- A ratio of special characters to regular characters in the received URL.
- A number of subdomains in the received URL.
- A length of a path in the received URL divided by the length of the received URL. The path comprises the string of information that comes after the top-level domain name in the URL.
- Whether or not (i.e., a binary value) processor 70 detects the character "@" in the received URL.

As described supra, extracted information 80 comprises page image keypoints 112. In some embodiments, processor 70 can apply a scale-invariant feature transform (SIFT) algorithm to screenshot 98 so as to identify page image keypoints 112 in the screenshot.

In the configuration shown in FIG. 2, score resources 82 comprises a URL severity model 114, a set of login keywords 116, a set of login HTML tags 117, and a set of logo records 118. In some embodiments, URL severity model 114 comprises a machine learning model executing on processor 70 that classifies, based on URL features 106, received URL 74 as either suspicious (i.e., suspected of being a URL for a phishing attack web page 42) or unknown. In these embodiments, processor 70 can train URL severity model 114 with training data comprising known malicious and known benign URLs 44 and their respective URL features 106.

Login keywords 116 comprise a set of words or phrases that, if detected in HTML code 96, indicate that retrieved web page 86 comprises a login form. If retrieved web page 86 comprises a login form, then this can be an indicator of a phishing attack, as the retrieved web page is requesting user credentials. Examples of login keywords 116 include, but are not limited to "password", "login", "sign in", "sign-in", "user id", "user-id" and "email".

HTML login tags 117 comprise a set of words or phrases that, if detected in HTML code, indicate that retrieved web page 86 comprises a login form. If retrieved web page 86 comprises a login form, then this can be an indicator of a phishing attack. Examples of login HTML tags 117 include, but are not limited to the HTML form tag <form> and the HTML input tag <input>.

Each logo record 118 comprises a logo image 120, one or more logo domains 122 and a set of logo keypoints 124. In some embodiments, processor 70 can apply a SIFT algorithm to each given logo image 120 so as to identify the logo keypoints 124 in the given logo image. The logo images and the logo domains in logo records 118 comprise validated logo images and their respective validated domains 46 that processor 70 can use for detecting phishing URLs 44, as described hereinbelow.

Score components 84 comprise a domain age flag 126, a search engine optimization (SEO) flag 128, a URL severity score 130, a logo flag 132 and a login form flag 134, that as described below, processor 70 computes and uses to compute phishing score 76.

In embodiments described herein, processor 70 can flag URL 74, age flag 126, login flag 134, SEO flag and logo flag 132 as either suspicious or unknown. Flagging a giving metric (i.e., URL 74, age flag 126, login flag 134, SEO flag or logo flag 132) as unknown indicates that processor 70 did not flag the given metric as suspicious.

Processors 58 and 70 comprise general-purpose central processing units (CPU) or special-purpose embedded processors, which are programmed in software or firmware to carry out the functions described herein. This software may be downloaded to computing devices 28 or security server 22 in electronic form, over a network, for example. Additionally or alternatively, the software may be stored on tangible, non-transitory computer-readable media, such as optical, magnetic, or electronic memory media. Further additionally or alternatively, at least some of the functions of processors 58 and 70 may be carried out by hard-wired or programmable digital logic circuits.

Examples of memories 60 and 72 include dynamic random-access memories, non-volatile random-access memories, hard disk drives and solid-state disk drives.

In some embodiments, tasks described herein performed by processors 58 and 70 may be split among multiple physical and/or virtual computing devices. In other embodiments, these tasks may be performed in a managed cloud service.

Phishing URL Detection

Figure 3:
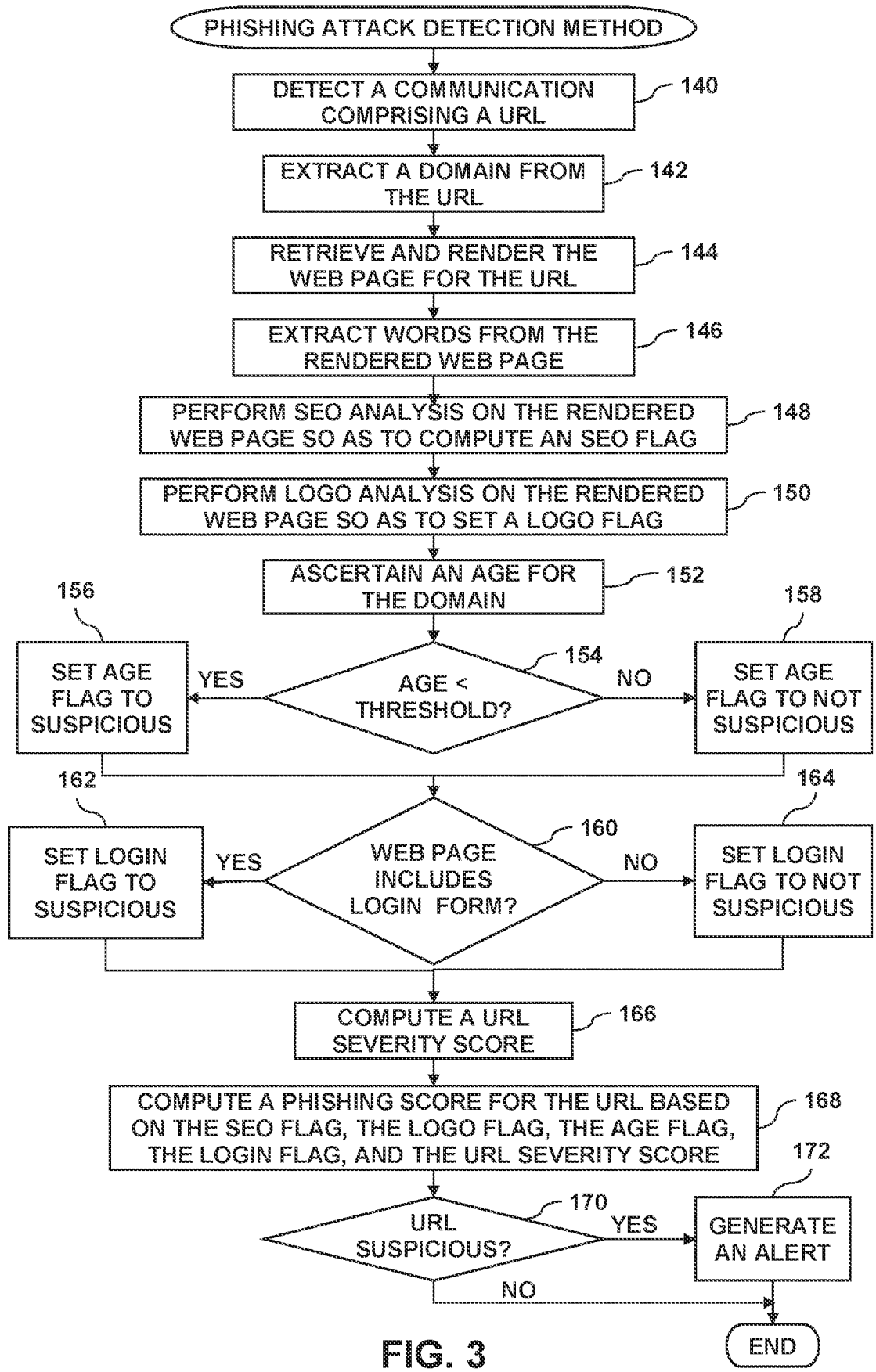
FIG. 3 is a flow diagram that schematically illustrates a method of detecting suspicious URL links indicative of a phishing attack, in accordance with an embodiment of the present invention.

FIG. 3 is a flow diagram that schematically illustrates a method of detecting a phishing attack on a given computing device 28, and FIGS. 4-7 are block diagrams shown data flows between endpoint agent 62, security server 22 and domain service server 38, in accordance with an embodiment of the present invention.

In step 140, processor 70 detects a digital communication that is received by a given computing device 28 and that comprises a given URL 24. In some embodiments (as shown in FIG. 1), the digital communication comprises a given email 26. In other embodiments (not shown), the digital communication may comprise an instant message such as a short message service (SMS) text message received by the given computing device or a given web page 42 retrieved by the given computing device.

Figure 4:
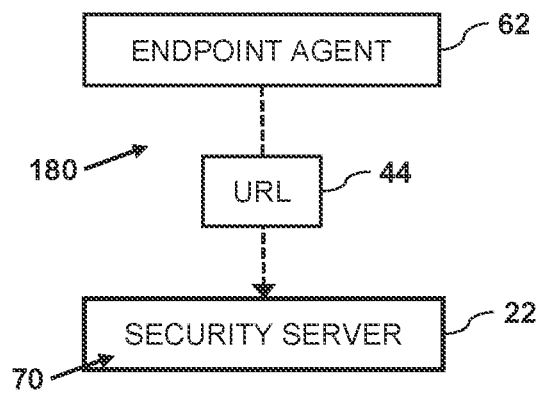
FIG. 4 is a block diagram that schematically illustrates an endpoint agent on a given computing device conveying a URL to the security server, in accordance with the first embodiment of the present invention.

In some embodiments, detecting the digital communication comprises the endpoint agent executing on the given computing device detecting the given email, and as shown in FIG. 4, conveying, to security server 22, a transmission 180 comprising the given URL.

In step 142, upon receiving the given URL, processor 70 stores the given URL to received URL 74, extracts domain 100 from the given URL, and in step 144, the processor retrieves and renders web page 88 (i.e., corresponding to the URL). In some embodiments rendering the web page comprises generating HTML code 96 and screenshot 98.

Figure 5:
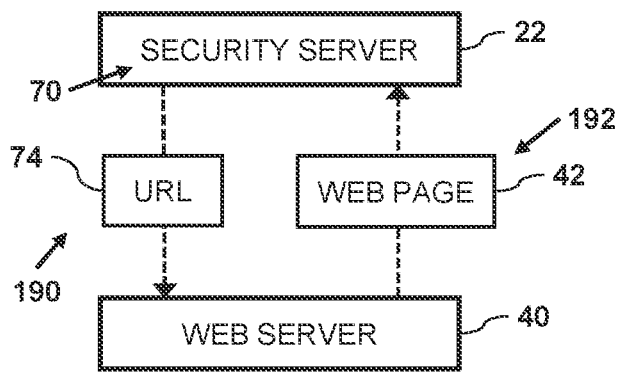
FIG. 5 is a block diagram that schematically illustrates the security server communicating with a web server so as to retrieve a web page referenced by the URL, in accordance with the first embodiment of the present invention.

As shown in FIG. 5, to retrieve the web page, processor 70 conveys, to the web server storing the web page, a web server request 190 comprising received URL 74, and in response to receiving web server request 190, the web server conveys, to security server 22, a web server response 192 comprising the web page corresponding to the URL in the request. Upon receiving the web page in web server response 192, processor 70 stores the received web page to retrieved web page 86, and renders the retrieved web page so as to generate HTML code 96 and screenshot 98 in web page information 78 using embodiments described supra.

In step 146, processor 70 extracts words 102 from rendered web page 88. In some embodiments, processor 70 can extract words 102 (i.e., a word is a basic element of language that carries an objective or practical meaning, can be used on its own, and is uninterruptible) from HTML code 96 in rendered web page 88.

In step 148, processor 70 performs an SEO analysis on the web information for the rendered web page so as to compute, for keywords 104, search engine ranking 138 and SEO flag 128. Performing the SEO analysis is described in the description referencing FIGS. 7 and 8 hereinbelow.

In step 150, processor 70 performs a logo analysis on screenshot 98 so as to set logo flag 132. Performing the logo analysis is described in the description referencing FIG. 9 hereinbelow.

Figure 6:
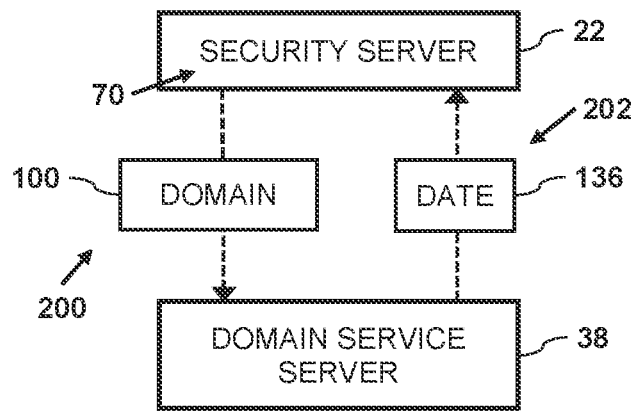
FIG. 6 is a block diagram that schematically illustrates the security server communicating with a domain service server so as to determine an age of a domain referenced by the URL, in accordance with the first embodiment of the present invention.

In step 152, processor 70 ascertains domain age 136 for domain 100. As shown in FIG. 6, processor 70 can ascertain domain age 136 by conveying, to domain service server 38 (e.g., providing the WHOIS™ service as described supra), an age request 200 comprising domain 100. In response to receiving age request 200, domain service server conveys, to security server 22, an age response 202 comprising a date 204 indicating a date when domain 100 was first registered. Upon receiving date 204 in response 202, processor 70 can use date 204 for computing an age for the domain, and stores the computed age to domain age 136.

In step 154, processor 70 compares domain age 136 to a specified age threshold. In some embodiments, lower values for domain age 136 can indicate a greater likelihood that URL 74 is associated with a phishing attack. For example, the specified age threshold can be three, six or nine months.

If, in step 154, processor 70 detects that domain age 136 is less than the specified age threshold, then in step 156 the server processor sets age flag 126 to suspicious. However, if, in step 154, processor 70 detects than domain age 136 is greater than or equal to the specified age threshold, then in step 158 the server processor sets age flag 126 to not suspicious.

In step 160, processor 70 analyzes HTML code 96 so as to determine whether or not retrieved web page 86 comprises a login form. Since login forms can request confidential user credentials, web pages comprising a login form are commonly used in phishing attacks and are therefore more suspicious than web pages not comprising a login form.

In a first embodiment, processor 70 can analyze HTML code 96 by comparing extracted words 102 to login keywords 116. In this embodiment, processor 70 can detect a login form in step 160 if a given extracted word 102 matches a given login keyword 116.

In a second embodiment, processor 70 can analyze HTML code 96 by determining whether or not the HTML code comprises any login HTML tags 117. In this embodiment, processor 70 can detect a login form if HTML code 96 comprises any login HTML tag 117).

If, in step 160, processor 70 detects a match between a given extracted word 102 and a given login keyword 116, then in step 162, the server processor sets login flag 134 to suspicious. However, if, in step 160, processor 70 does not detect a match between a given extracted word 102 and any given login keyword 116, then in step 164, the server processor sets login flag 134 to not suspicious.

In step 166, processor 70 computes URL severity score 130. Computing URL severity score 130 is described in the description referencing FIG. 10 hereinbelow.

In step 168, processor 70 computes phishing score 76 based on score components 84 and/or extracted information 80. In some embodiments, processor 70 can use phishing score 76 so as to flag received URL 74 as either suspicious (i.e., URL 74 is suspected of belonging to a phishing attack) or unknown. For example, processor 70 can compute phishing score 76 as follows:

$$\text{Score} = (\text{age flag } \mathbf{126}) * w1 + (\text{SEO flag } \mathbf{128}) * w2 + (\text{URL severity score } \mathbf{130}) * w3 + (\text{logo flag } \mathbf{132}) * w4 + (\text{login flag } \mathbf{134}) * w5$$

where w1 . . . w5 comprise different respective weights.

In step 170, if processor 70 detects that phishing score 76 indicates that received URL 74 is suspected of belonging to a phishing attack (e.g., by comparing the phishing score to a specified score threshold), then in step 172, the server processor flags the received URL as suspicious, generates an alert (e.g., by blocking access to the received URL), and the method ends. If, in step 170, processor 70 does not flag received URL 74 as suspicious, then the method ends. Generating an alert may also be referred to herein as raising an alert.

For purposes of visual simplicity, FIG. 3 shows the steps of performing the SEO analysis (step 148, and described in the description referencing FIG. 7 hereinbelow), setting the logo flag (step 150, and described in the description referencing FIG. 9 hereinbelow), ascertaining the age for the domain (step 152), determining whether or not screenshot 98 comprises a login form (step 160), and computing the severity score (step 166, and described in the description referencing FIG. 10 hereinbelow). In an alternative embodiment, upon receiving URL 74 and rendering HTML code 96 and screenshot 98 in web page 88, performing two or more of these steps in parallel (e.g., simultaneously on processor 70 or in a managed cloud service) is considered to be within the spirit and scope of the present invention.

Figure 7:
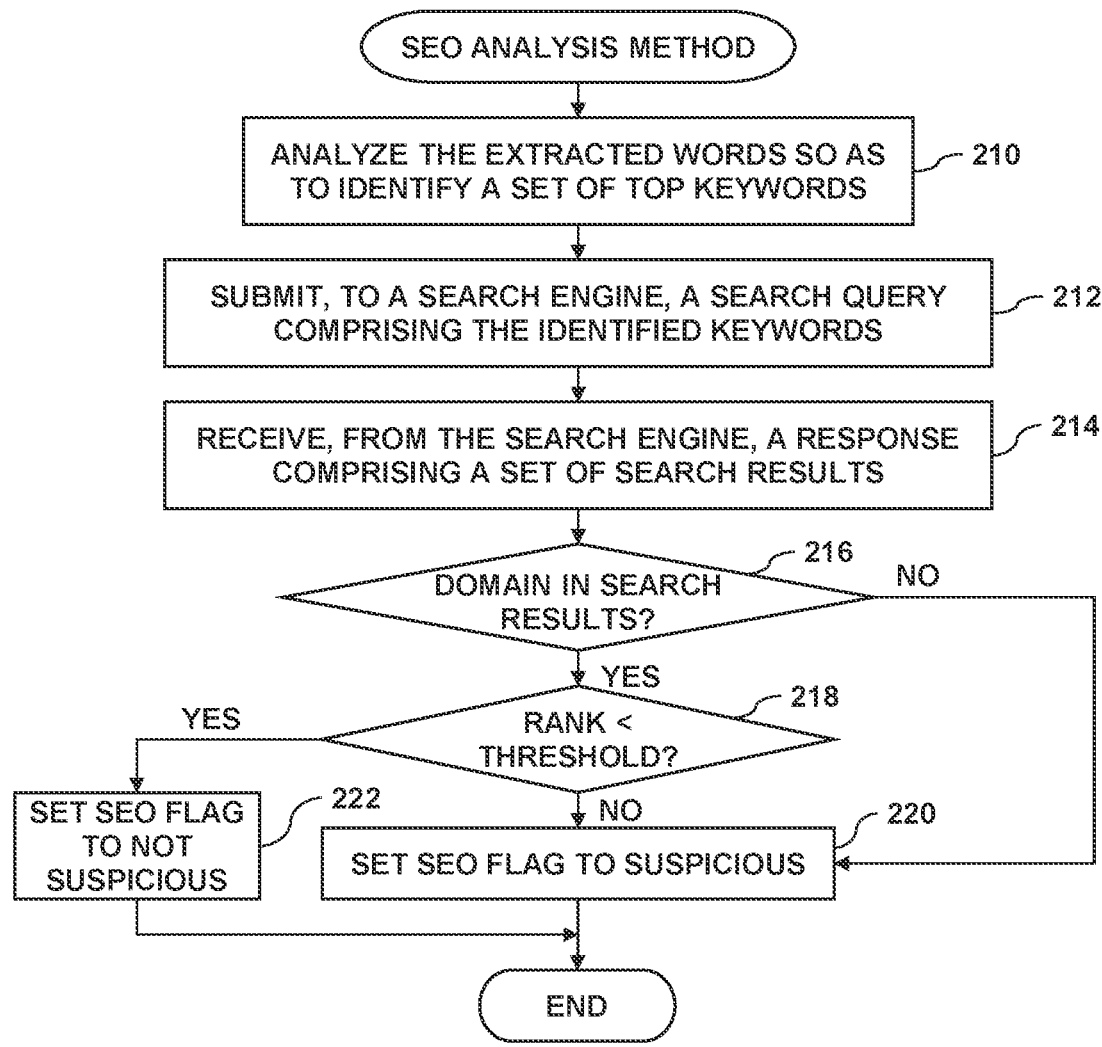
FIG. 7 is a flow diagram that schematically illustrates a method of using a search engine to analyze keywords extracted from the web page, in accordance with an embodiment of the present invention.
Figure 8:
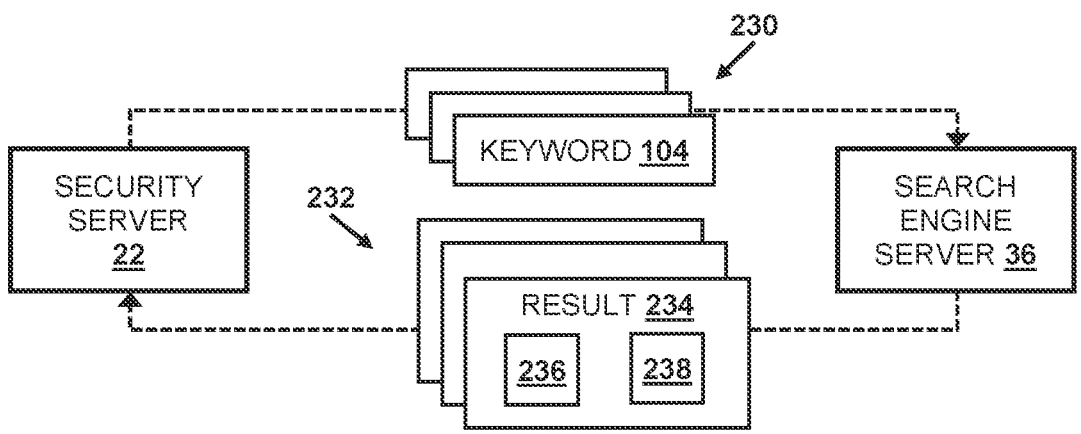
FIG. 8 is a block diagram that schematically illustrates the security server communicating with the search engine, in accordance with the first embodiment of the present invention.

FIG. 7 is a flow diagram that schematically illustrates a method of performing an SEO analysis on extracted words 102 so as to compute search engine ranking 138 and SEO flag 128, and FIG. 8 is a block diagram shown data flows between security server 22 and search engine server 36, in accordance with an embodiment of the present invention.

In step 210, processor 70 identifies, in extracted words 102, keywords 104. As described supra, processor 70 can apply a statistical model such as TF-IDF to extracted words 102 so as to identify keywords 104. As a result of applying the statistical, keywords 104 comprise a set of "most important" words 102 in HTML code 96. Therefore, keywords 104 can be viewed as a "signature" for retrieved web page 86.

To train the TF-IDF model, the inventors used the BRITISH NATIONAL CORPUS (http://www.natcorp.ox.ac.uk/) as a universe of words so as to enable the model to identify the most important words 102 in HTML code 96.

In step 212, processor 70 submits, to search engine server 36, a search request 230 (FIG. 8) comprising keywords 104.

In step 214, in response to submitting search request 230, processor 70 receives, from search engine server 36, a search response 232 comprising a set of search results 234. In the example shown in FIG. 8, each given search result 234 comprises a domain 236 and may comprise a rank 238. In one embodiment, response 232 may comprise the top 20 (i.e., "first page" of) search results, and the result comprise respective domains 236 and rankings 238 (i.e., 1-10). In other embodiments, search result 234 may comprise any number (e.g., 15, 25, 50) of "top" search results 234.

In step 216, processor 70 compares domain 100 to domains 236 in search results 234.

If, in step 216, processor 70 detects a match between a domain 100 and a given domain 236, then in step 218, processor 70 compares the respective rank 238 of the matched domain 236 to a specified rank threshold.

If, in step 218, if the respective rank is equal to or greater than the specified rank threshold, then in step 220, processor 70 sets SEO flag 128 to suspicious, and the method ends. However, in in step 218, if the respective rank less than the specified rank threshold, then in step 222, processor 70 sets SEO flag 128 to not suspicious, and the method ends.

Returning to step 216, if in step 216, processor 70 does not detect a match between a domain 100 and any given domain 236, then the method continues with step 220.

In some embodiments, response 232 may comprise a small number of results 234, e.g., the top 20 (i.e., "first page" of) results 234. In these embodiments, processor 70 can skip step 218, and continue with (a) step 220 if, in step 216, the server processor does not detect a match between domain 100 and any given domain 236 (and therefore the server processor does not need rankings 238 for domain 100), or (b) step 222 if, in step 216, the server processor detects a match between domain 100 and a given domain 236.

Figure 9:
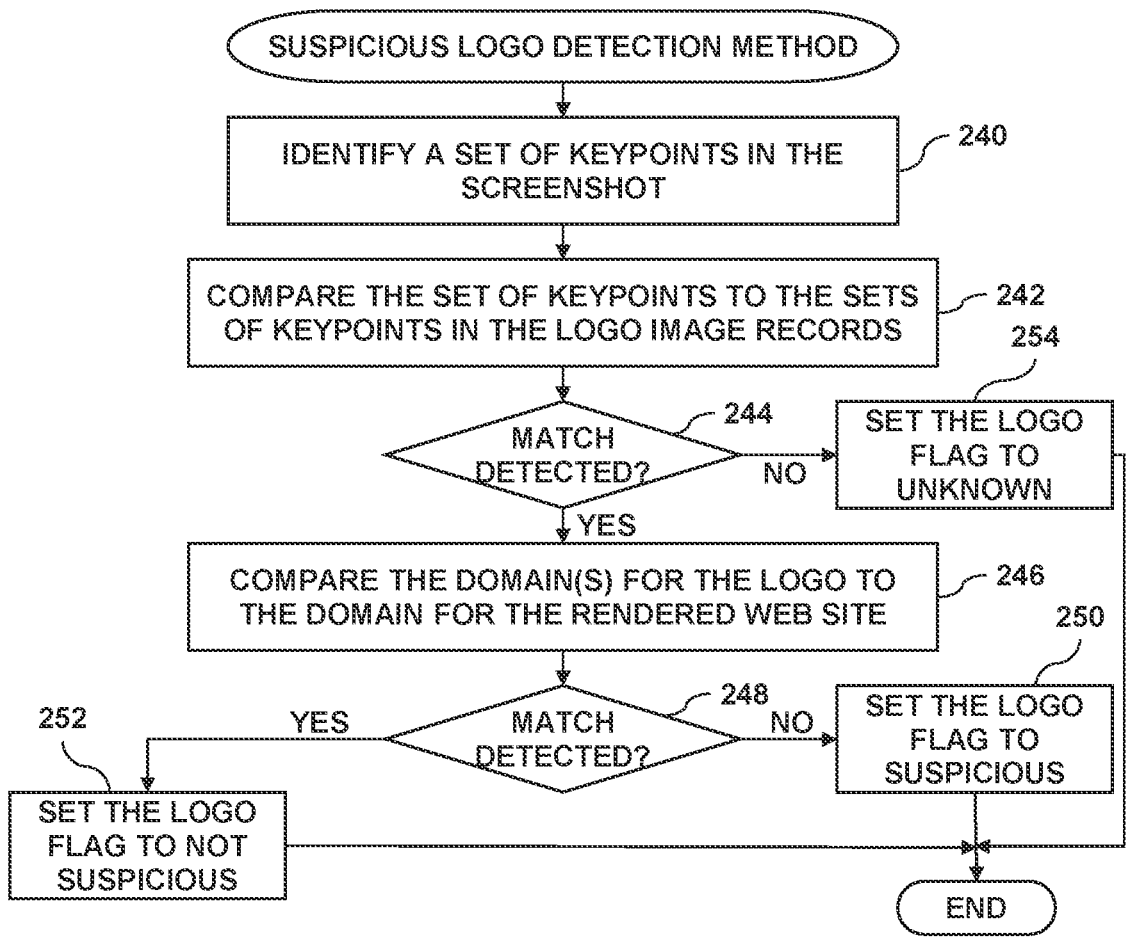
FIG. 9 is a flow diagram that schematically illustrates a method of analyzing the domain and a logo extracted from the web page, in accordance with an embodiment of the present invention.

FIG. 9 is a flow diagram that schematically illustrates a method of detecting a suspicious digital image indicating an imposter logo image, in accordance with an embodiment of the present invention.

In step 240, processor 70 identifies page image keypoints 112 in screenshot 98. As described supra, processor 70 can identify page image keypoints 112 by application a SIFT algorithm to screenshot 98.

In step 242 processor 70 compares screenshot 98 to logo images 120 in order to detect of there is a match between the screenshot and any logo image 120 (i.e., if there are any logo images 120 in the screenshot). In some embodiments processor 70 can compare screenshot to logo images 120 by comparing page image keypoints 112 for screenshot 98 to respective keypoints 124 of logo images 120. For example, if processor 70 uses a SIFT algorithm, then the server processor can compare screenshot 98 to logo images 120 by comparing respective SIFT distances between keypoints 112 and 124. In these embodiments, processor detect a match between screenshot 98 and a given logo image 120 if at least a specific threshold (e.g., 10, 15, 20 or 25) of page image keypoints 112 match keypoints 124 for the given logo image.

In step 244, if processor 70 detects a match between screenshot 98 and a given logo image 120, then in step 246 processor 70 compares domain 100 to the one or more respective logo domains 122 for the given logo image.

In some embodiments, domains 100 and 122 may refer to the resolved "owner" of the domain. For example, while the domain for the URL "www.microsoft.com" is MICROSOFT™, the domain for "www.skype.com" is SKYPE™ and the domain for "www.office.com" is OFFICE™, all these domains are owned by Microsoft Corporation. In these embodiments, processor 70 may detect a match between domains 100 and 122 if they have the same owner. In this case, processor 70 would classify SKYPE™ and OFFICE™ as matching domains.

In step 248, if domain 100 does not match any of the one or more respective logo domains 122 (i.e., none of the one or more respective logo domains 122 match domain 100), then in step 250, processor 70 sets logo flag 132 to suspicious, and the method ends.

However, in step 248, if domain 100 matches any of the one or more respective logo domains 122, then in step 252, processor 70 sets logo flag 132 to not suspicious, and the method ends.

Returning to step 244, if processor 70 does not detect a match between screenshot 98 and any given logo image 120, then in step 254, the server processor sets logo flag 132 to unknown, and the method ends.

In some embodiments, security server 22 can be configured to allow a user (not shown) to add/delete/edit logo records 118. This can be useful for enabling security server 22 to detect spear phishing attacks, which comprises a digital communication (e.g., an email) targeting e a specific individual, organization or business.

Figure 10:
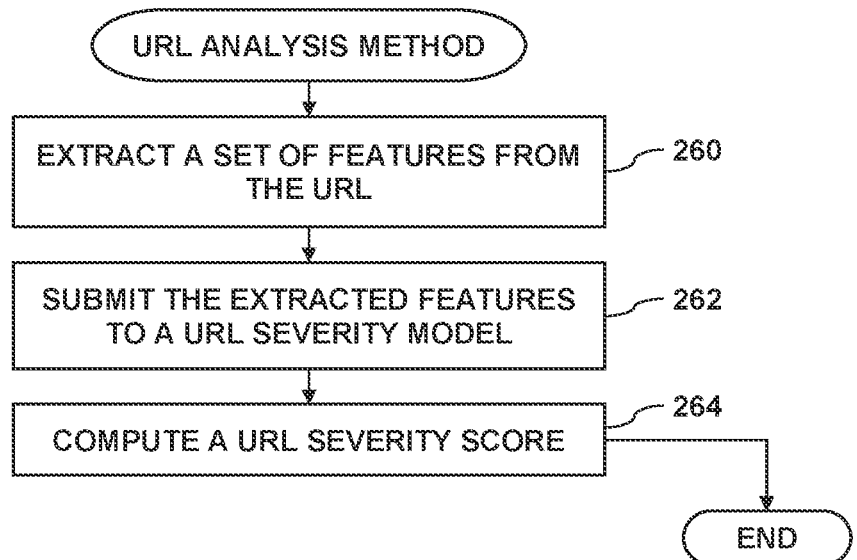
FIG. 10 is a flow diagram that schematically illustrates a method of analyzing the URL, in accordance with an embodiment of the present invention.

FIG. 10 is a flow diagram that schematically illustrates a method of analyzing received URL 74 using URL severity model 114, in accordance with an embodiment of the present invention.

In step 260, processor 70 extracts URL features 106 from received URL 74, using embodiments described supra.

In step 262, processor 70 submits extracted URL features to URL severity model 114.

Finally, in step 264, based on URL features 196, URL severity model 114 computes URL severity score 130 by using URL severity model 114 to model the features, and the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computing device, comprising:
   detecting an email received by the computing device and comprising a Uniform Resource Locator (URL) for a web page in a first domain;
   retrieving the web page from the first domain;
   determining a plurality of words that would be visible when the web page is rendered;
   selecting, from the plurality of words, a set of words to be used as keywords;
   submitting, to a search engine, a query comprising the set of keywords;
   receiving, from the search engine, a response to the query, the response indicating a set of second domains and respective rankings for the second domains, where the ranking for a given second domain is provided by relative position of the given second domain in the set of second domains and is indicative of a quality of the second domain in relation to the keywords; and
   generating an alert for a phishing attack responsively to detecting that either the first domain does not match any of the second domains or the first domain matches a second domain that has a ranking exceeding a specified ranking threshold.

2. The method according to claim 1, and further comprising retrieving Hypertext Markup Language (HTML) code associated with the web page, rendering the HTML code, and determining, based on the rendering, the words that would be visible.

3. The method according to claim 1, wherein selecting the set of keywords comprises applying a statistical model to the plurality of words so as to rank the words in order of importance, wherein the set of keywords comprises a specific number of the highest ranked words.

4. The method according to claim 1, wherein the web page comprises a first web page, wherein the first web page comprises a redirection to a second web page, and wherein selecting the set of keywords comprises determining the plurality of words that would be visible when the second web page is rendered and selecting, from the plurality of words, the set of words to be used as keywords.

5. The method according to claim 4, wherein the redirection comprises the first web page redirecting to the second web page within a specified amount of time.

6. The method according to claim 1, and further comprising identifying a first owner of the first domain, and identifying respective second owners for the second domains, and wherein detecting that the first domain does not match any of the second domains comprises detecting that the first owner does not match any of the second owners.

7. The method according to claim 1, and further comprising generating a screenshot of the retrieved web page, comparing the screenshot to logo images in a set of logo images, each logo image associated with a respective third domain, and generating the alert upon detecting a match between the screenshot and a given logo image in the set of logo images where the third domain associated with the given logo image does not match the first domain.

8. The method according to claim 7, wherein comparing the screenshot to the logo images comprises generating a first set of first keypoints for the screenshot, generating respective second sets of second keypoints for the logo images, and comparing the first set to the second sets.

9. The method according to claim 8, wherein detecting the match between the generated screenshot and the given logo image comprises detecting at least a specified number of matches between the first set of first keypoints and the second set of second keypoints for the given logo image.

10. The method according to claim 8, wherein comparing the first set to the second set comprises measuring respective scale-invariant feature transform (SIFT) distances between the first and the second sets.

11. The method according to claim 1, and further comprising generating the alert upon detecting a login form in the retrieved web page.

12. The method according to claim 11, wherein detecting the login form comprises rendering HTML code for the retrieved web page, extracting a set of words from the HTML code, comparing the extracted words to a set of login keywords, and detecting a match between a given extracted word and a given login keyword.

13. The method according to claim 12, wherein detecting the login form comprises rendering HTML code for the retrieved web page, extracting a set of HTML tags from the HTML code, comparing the extracted words to a set of login tags, and detecting a match between a given extracted word and a given login tag.

14. The method according to claim 1, and further comprising ascertaining an age of the first domain, and generating the alert upon detecting that the age exceeds a specified age threshold.

15. The method according to claim 1, and further comprising extracting a set of features from the URL, modeling the extracted features so as to classify the URL as either suspicious or unknown, and generating the alert upon classifying the URL as suspicious.

16. The method according to claim 15, wherein a given feature comprises a number of times any of one or more specified characters are in the URL.

17. The method according to claim 15, wherein a given feature comprises a number of times any of one or more specified words are in the URL.

18. The method according to claim 15, wherein a given feature comprises whether or not the web page is hosted by a free hosting service.

19. The method according to claim 15, wherein a given feature comprises whether or not the URL comprises an Internet Protocol (IP) address.

20. The method according to claim 15, wherein a given feature comprises a number of subdomains in the URL.

21. The method according to claim 16, wherein a given feature is selected from a group including a length of a path in the URL, a length of the URL and a length of the domain.

22. A computing device, comprising:
    a memory; and a processor configured:
    to detect an email received by the computing device and comprising a Uniform Resource Locator (URL) for a web page in a first domain,
    to retrieve the web page from the first domain,
    to determine a plurality of words that would be visible when the web page is rendered,
    to select, from the plurality of words, a set of words to be used as keywords,
    to submit, to a search engine, a query comprising the set of keywords,
    to receive, from the search engine, a response to the query, the response indicating a set of second domains and respective rankings for the second domains, where the ranking for a given second domain is provided by relative position of the given second domain in the set of second domains and is indicative of a quality of the second domain in relation to the keywords, and
    to generate an alert for a phishing attack responsive to detecting that either the first domain does not match any of the second domains or the first domain matches a second domain that has a ranking exceeding a specified ranking threshold.

23. A computer software product for protecting a computing device, the computer software product comprising a non-transitory computer-readable medium, in which program instructions are stored, which instructions, when read by a computer, cause the computer:
    to detect an email received by the computing device and comprising a Uniform Resource Locator (URL) for a web page in a first domain;
    to retrieve the web page from the first domain;
    to determine a plurality of words that would be visible when the web page is rendered;
    to select, from the plurality of words, a set of words to be used as keywords;
    to submit, to a search engine, a query comprising the set of keywords;
    to receive, from the search engine, a response to the query, the response indicating a set of second domains and respective rankings for the second domains, where the ranking for a given second domain is provided by relative position of the given second domain in the set of second domains and is indicative of a quality of the second domain in relation to the keywords; and
    to generate an alert for a phishing attack responsive to detecting that either the first domain does not match any of the second domains or the first domain matches a second domain that has a ranking exceeding a specified ranking threshold.

\* \* \* \* \*